Figure 1:
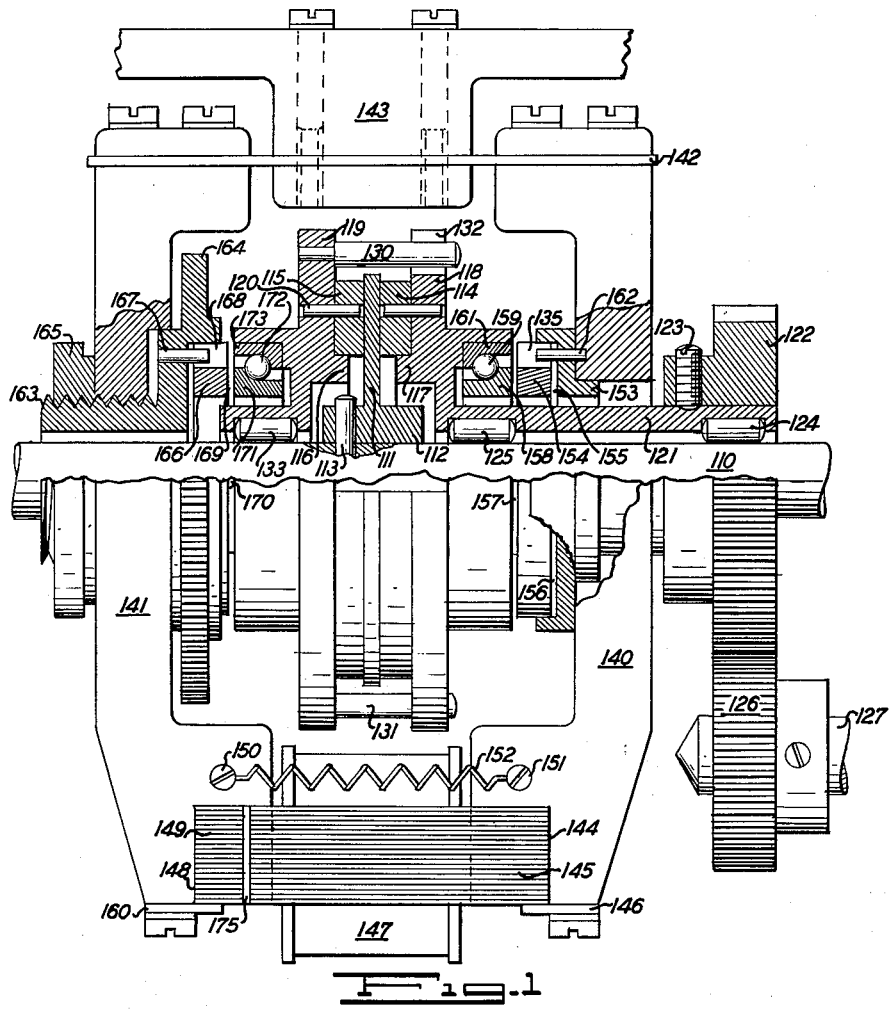

United States Patent Office 3,000,482
Patented Sept. 19, 1961

3,000,482
ELECTRO-MAGNETICALLY ACTUATED DRIVING
DEVICES FOR COMPUTING MACHINES
Henri G. Feissel, Paris, France, assignor to Compagnie
des Machines Bull (Societe Anonyme), Paris, France
Filed Nov. 7, 1958, Ser. No. 772,612
Claims priority, application France Nov. 29, 1957
7 Claims. (Cl. 192—84)

This invention relates to improvements in electro-magnetically actuated driving devices, and more particularly, to rapidly engageable drive devices employed in high-speed accounting and computing machines for the rapid and accurate feed and positioning of record cards, sheets or tapes. In these machines, the speed required for the actuation of the devices is often of the order of a thousandth of a second and considerable difficulties are generally encountered in providing devices permitting such performances.

In electro-magnetically actuated driving devices which do not utilize the friction produced by magnetic adhesion for transmitting a movement, pressure is required to drive the mechanisms by friction. It is known to supply this pressure by means of magnetic attraction exerted on a moving armature of an electro-magnet when the latter is energized. The movement of this armature and of those parts which it displaces for transmitting the pressure to friction surfaces has, among other disadvantages, that of delaying the actuation of the device by reason of the inertia of the movable armature and of the displaced parts. Moreover, the movement of the movable armature produces a variation in the air gap of the electro-magnet, which has the disadvantage of delaying the establishment of the electric current in the energizing winding.

The object of this invention is to obviate these disadvantages by means of an arrangement which provides a considerable reduction, in such a device, in the amount of variation required in the air gap to transmit the force developed by the movable armature of an electro-magnet to the friction surfaces.

The arrangement comprises particular features by virtue of which the forces of inertia are reduced, whereby the speed of actuation of the device can be increased, and the dimensions and the power of the electro-magnet required for actuating the device can be reduced.

In a preferred form of the invention, the force supplied by the electro-magnet is transmitted to the friction surfaces through members which have no appreciable idle motion or flexure, and the friction surfaces are made with hard surfaces having a high coefficient of friction. For this purpose, the friction surfaces preferably consist of metal surfaces which rub on hard ceramic friction surfaces having a high coefficient of friction and high resistance to wear and deformation. The friction surfaces and the means for transmitting a pressure to the surfaces are so designed that the friction surfaces cannot undergo wear due to unevenly distributed surface deformations which are capable of producing wedging and which might rapidly result in the mechanism being rendered unserviceable, as sometimes occurs in devices comprising cylindrical or conical friction surfaces. Simple adjustment means are provided to permit immediate compensation for the wear on the friction surfaces and restoration of the optimum adjustment of the device even after prolonged use.

Figure 2:
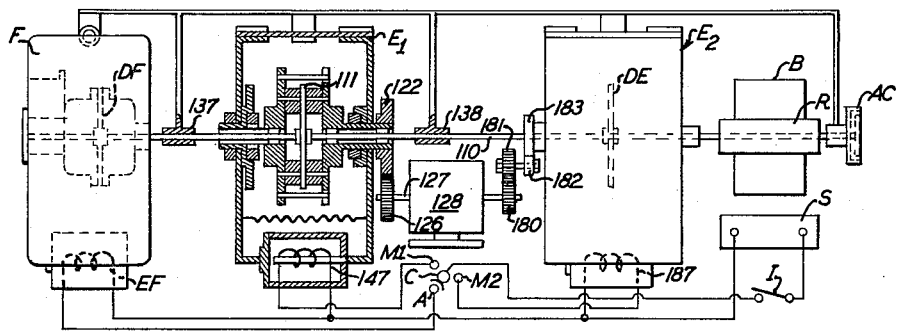

For a better understanding of the invention and to show how it may be carried into effect, the same will now be described, by way of example, with reference to the accompanying drawings, in which:

FIGURE 1 is a view, partially in longitudinal section, of a driving device in accordance with the invention, and FIGURE 2 is a diagrammatic view of a mechanism showing various methods of utilizing the driving device in combination with a quick-action braking device.

In the drive device illustrated in FIGURE 1, a shaft 110 coupled with a mechanism to be driven, is provided with a friction disc 111 projecting from a sleeve 112 which is fixedly mounted on the shaft 110 by means of a pin 113. Disposed on either side of the disc are friction rings 114 and 115, which are mounted on bearing surfaces 116 and 117 respectively provided on rotatable pressure members 118 and 119. The friction rings are fixedly secured to the pressure members by means of rivets 120. The pressure member 118 is connected to and forms an extension from a cylindrical member 121 on which is mounted a pinion 122, the latter being fixed to the member 121 by a screw 123. The cylindrical member 121 constitutes a primary driving shaft and is adapted to rotate on the shaft 110 by means of bearings 124 and 125. The shaft 110 can be designated as "secondary shaft." The pinion 122 meshes with a pinion 126 keyed to a shaft 127 of a driving motor 128 (FIGURE 2). The pressure member 119 is arranged to rotate as a unit integrally with pressure member 118 by means of pins 130 and 131 riveted in the member 119 and engaged in grooves 132 formed in the member 118. The pressure member 119 is adapted to rotate on the secondary shaft 110 by means of a bearing 133. Two members 140 and 141 forming jaws are fixed in the upper part of the mechanism to a flexible blade 142 which forms a joint between the jaws. The blade, which is fixed at its center to the frame 143 of the machine, thus supports the jaws and the members connected therewith. The secondary shaft 110 on which the disc 111 is mounted and on which the bearings 124, 125 and 133 rotate is supported on either side of the device by plain bearings 137 and 138 (FIGURE 2). The lower part of the jaw 140 is formed with a recess 144, in which a laminated armature 145 of the magnetic circuit of an electro-magnet is retained by means of a plate 146. Mounted on one arm of the armature is a coil 147 for the energization of the electro-magnet. A laminated armature 149 of bar form is maintained by means of a plate 160 in a recess 148 formed in the lower part of the jaw 141. This armature closes the magnetic circuit of the electro-magnet through an air gap 175. Fixed on each side of the jaws 140 and 141 are studs 150 and 151, on which are engaged two springs 152, a single spring is shown in FIGURE 1, the other spring being symmetrically disposed on the other side of the jaws. The two springs 152 are arranged to exert on the jaws 140 and 141 a force sufficient to maintain the friction surfaces of the disc 111 and of the friction rings 114 and 115 in permanent contact and to eliminate all idle motion between the members for transmitting to the friction surfaces the force developed by the electro-magnet when it is energized. One way in which this force is transmitted to the faces of the disc 111 by the jaws 140 and 141 is through a ring 153 which is embedded in the jaw 140. Engaged with some clearance in the ring 153 is a joint ring 154 which is provided, on one face, with two bosses 155 and 156 which are diametrically opposed and bearing on the inner face of the ring 153. The joint ring 154 is provided on its other or second face with two further bosses 157 which are diametrically opposed and disposed at an angular distance of 90° with respect to the bosses 155 and 156 of the first face. In FIGURE 1, only one of the bosses 157 of the second face of the ring 154 can be seen. A pin 162 fitted in the jaw 140 extends through the ring 153 and engages in a groove 135 so as to prevent the ring 154 from turning. The bosses 157 of the second face of the ring 154 bear on the inner race 158 of a ball bearing 159, the outer race 161 of which is fitted in a recess formed in the pressure member 118. The bearing 159 forms an abutment and transmits to pressure member 118 and to the friction ring 114 bearing on the disc 111 the force exerted by the springs 152 and the force exerted by the electro-magnet when it is energized. Another way in which these forces are transmitted to the disc 111 is through a screw-threaded adjustment member 163 screwed into the jaw 141. A knurled disc 164 formed as an extension of the member 163 permits the screwing of the latter into the jaw 141 in one direction or the other. A lock nut 165 permits the locking of the member 163 in the desired position. The knurled disc 164 is formed with a recess in which a joint ring 166 identical with the ring 154 is fitted with some clearance and bears on the disc 164 through two bosses 169 which are diametrically opposed. A pin 167 fitted in the disc 164 is engaged in a groove 168 formed in the ring 166 to prevent the latter from turning. A boss 170 on one face of the joint ring 166 and a similar boss diametrically opposed on the same face, bear on the inner race 171 of a ball bearing 172 which forms an abutment and the outer race 173 which fits in a recess formed in the pressure member 119.

Referring to the permanent action of the two springs 152 on the jaws 140 and 141, it will be evident that the air gap 175 of the electro-magnet can be varied, and thus adjusted, by screwing or unscrewing the member 163 in the jaw 141, whereby it is also possible, after prolonged wear, to restore this adjustment to its optimum value in order to take up the wear on the friction surfaces of the disc 111 and of the friction rings 114 and 115. The purpose of the joint rings 154 and 166 is to transmit to the members carrying the friction surfaces uniform pressure exerted on the jaws 140 and 141, regardless of the differences of adjustment of the air gap of the electro-magnet. In the arrangement heretofore described, it is assumed that the material of the friction rings is substantially incompressible and that the force developed by the electro-magnet is transmitted to the friction surfaces through members having substantially no idle motion and no flexure. Consequently, the variation of the air gap of the electro-magnet when the latter is energized is negligible and the air gap can be adjusted to a very small value. This permits the utilization of the maximum force which can be developed by the magnetic attraction exerted between the armatures of the electro-magnet when it is energized. Moreover, the jaws which transmit to the friction surfaces the force supplied by the armatures are arranged so as to form levers and to amplify this force in inverse proportion to the lever arms. The permanent action of the two springs 152 on the friction surfaces has the disadvantage, when the friction rings are driven by the motor, of transmitting an appreciable permanent torque to the shaft 110 by friction. When the driving mechanism is employed to drive a mechanism having considerable passive resistances, this permanent torque may not be troublesome.

In mechanisms for rapidly and accurately driving and positioning record sheets or tapes, a driving device according to FIGURE 1, can be advantageously employed in combination with a quick-acting electro-magnetically actuated braking device. Such a braking device exerts on the shaft of the controlled mechanism a permanent braking action which can be adjusted to compensate for the permanent torque transmitted to the shaft driven by the driving device. The diagrammatic drawing of FIGURE 2 shows an example of the application of driving devices according to FIGURE 1 in a mechanism for the accurate feeding and positioning of accounts sheets in an accounting machine. This mechanism comprises a driving device E1 arranged to control the drive of the accounts sheets in one direction. Another driving device E2 is arranged to control the drive of the accounts sheets in an opposite direction. These driving devices are associated in the mechanism with a quick-acting braking device F which is arranged to hold the driving devices fast under predetermined conditions. In the mechanism as illustrated, an accounts sheet B is driven by a roller R rotatably coupled with the secondary shaft 110 through a coupling AC, which coupling is adapted also to permit operation of the roller in the manner of a typewriter platen. Keyed on the same shaft are the driving disc 111 of the driving device E1, the disc DF of the quick-acting braking mechanism F and the disc DE of the driving device E2. The mechanism E1 is driven by a motor 128 through pinions 126 and 122, while the mechanism E2 is driven through pinions 180, 181, 182 and 183. The latter pinions drive the mechanism E2 at reduced speed in the opposite direction to the rotation of the mechanism E1. Electro-magnets EF, 147 and 187 are arranged to receive the electric current from a current source S through a make-and-break switch I and a change-over switch C. The change-over switch C diagrammatically illustrated in FIGURE 2 has three positions of contact and comprises a contact stud A through which a circuit is closed to energize the electro-magnet EF of the braking device F for stopping the shaft 110 or holding it station, a stud M1 which controls the energization of the electro-magnet 147 for starting the shaft 110 through the mechanism E1 and a stud M2 by which the electro-magnet 187 can be energized to control the rotation of the shaft 110 in the opposite direction through the driving mechanism E2. The change-over switch C, which is illustrated very diagrammatically, can be replaced by an electronic change-over device or one comprising an appropriate relay, depending upon the applications. The mechanism described in the present example for the rapid feed and accurate positioning of accounts sheets is applicable, for example, to a sheet positioning device of the type described in copending patent application No. 688,901 filed in the United States of America on the 8th October 1957, and assigned to Machines Automatiques Modernes. In such a machine, an accounts sheet is provided with conductive tapes or marks which close electric contacts controlling the automatic positioning of the sheet when it is introduced into the machine. When the motor 128 is in operation, the make-and-break switch I is closed and the change-over switch C is at the position A, and the contacts closed by the introduction of an accounts sheet into the machine effect the change-over of the switch C from the position A to the position M1. At this instant, the electro-magnet EF is de-energized and the electro-magnet 147 is energized. The disc DF of the brake is released and the disc 111 is gripped between the jaws of the device E1, which rapidly drive the shaft 110 and the roller R, which drive the accounts sheet B in the machine. Travel beyond an accounts line marked on the accounts sheet by a break in the conductive line produces the opening of a circuit which causes the change-over switch C to move from the position M1 to the position M2. Consequently, the electro-magnet 147 is de-energized and the electro-magnet 187 is energized. The secondary shaft 110 is then driven in the opposite direction and at a reduced speed in order to bring the accounts sheet exactly to the position required. When this position is reached, a conductive mark on the sheet actuates the change-over switch C, which is brought to the position A in which the electro-magnet 187 is no longer energized and the shaft 110 is held fast by the energization of the electro-magnet EF. For ejecting the accounts sheet B from the machine, the change-over switch C is temporarily brought, for example, by depression of a key, onto the stud M2, which effects the ejection of the sheet, and is thereafter automatically returned to the stud A when the sheet is ejected.

It is obvious that the example described heretofore is in no way limiting and that any modification of form or of details may be made to the described devices in accordance with the circumstances and the applications without departing from the spirit or scope of the invention.

I claim:
1. In an electro-magnetically actuated drive device, a primary driving shaft adapted to rotate continuously, a secondary shaft for a mechanism to be driven, a friction disc keyed on said secondary shaft, a first pressure member driven by said primary shaft, a first friction ring fixed on said first pressure member to engage a first face of said friction disc, a second pressure member driven by the first pressure member, a second friction ring fixed on said second pressure member to engage the other face of said friction disc, a coupling electro-magnet having two armatures, two levers each flexibly connected at one end to a fixed point and connected at the other end, respectively, to the two armatures of said electro-magnet and arranged to exert an amplified pressure on said pressure members when the electro-magnet is energized, so that the pressure of the friction rings of said pressure members on said friction disc is increased to rotatively drive said secondary shaft from said primary shaft.

2. In a drive device according to claim 1, an oscillating joint member provided between each lever and the pressure member of the associated friction ring, to transmit the coupling pressure to said pressure member and to compensate for differences in the position of said lever in relation to said pressure member.

3. In a drive device according to claim 2, an adjusting member screwably mounted in one of said levers for permitting variation in the distance between said one lever and the pressure member of the associated friction ring to compensate for wear on the friction surfaces and to permit of adjustment of the size of the air gap of the electro-magnet.

4. In an electromagnetically actuated drive device, a first driving shaft adapted to rotate continuously, a secondary shaft for a mechanism to be driven, a friction disc having two faces and keyed on said secondary shaft, a first pressure member adapted to rotate integrally with said primary shaft, a first friction ring fixed on said first member to engage a first face of said friction disc, a second pressure member rotatively driven by the first pressure member, a second friction ring fixed on said second pressure member to engage the other face of said friction disc, a coupling electro-magnet, having two armatures, a fixed bracket, two levers each flexibly connected at one end to said bracket and connected at the other end, respectively, to the two armatures of said electro-magnet and arranged to exert an amplified pressure on said pressure members when the electro-magnet is energized, so that the pressure of the friction rings of said pressure members on said friction disc is increased, to relatively drive said secondary shaft from said primary shaft.

5. In a drive device according to claim 4, an oscillating joint member provided between each lever and the pressure member of the associated friction ring to transmit the coupling pressure to the said pressure member and to compensate for differences in the position of the said lever in relation to the said pressure member.

6. In a drive device according to claim 5, an adjusting member screwably mounted in one of said levers for permitting variation in the distance between said one lever and the pressure member of the associated friction ring to compensate for wear on the friction surfaces and to permit of adjustment of the size of the air gap of the electro-magnet.

7. In an electro-magnetically operated drive mechanism comprising a primary driving shaft adapted to rotate and a secondary shaft for a device to be driven into rotation, a friction disc having two flat faces and keyed onto said secondary shaft, a first flat pressure member disposed in close proximity of one face of said disc and rotatable integrally with said primary shaft, a second flat pressure member disposed in close proximity to the other face of said disc, means for rotatably coupling both said pressure members while securing a variable spacing therebetween, a clutching electro-magnet having two armatures, a fixed bracket and two plates articulated at one end on said bracket and fixedly coupled at their other end respectively to said armature, these plates being arranged to press said pressure members against the related disc faces when said electro-magnet is energized.

References Cited in the file of this patent
UNITED STATES PATENTS

| | | |
|---|---|---|
| 1,290,199 | Holland | Jan. 7, 1919 |
| 1,846,687 | Mentor | Feb. 23, 1932 |